United States Patent

Dasgupta

US005771286A

[11] Patent Number: 5,771,286
[45] Date of Patent: Jun. 23, 1998

[54] SPEECH AMPLIFIER ASSOCIATED WITH AN LED

[75] Inventor: Uday Dasgupta, Singapore, Singapore

[73] Assignees: SGS-Thomson Microelectronics Pte Ltd, Singapore, Singapore; SGS-Thomson Microelectronics Pte Ltd, Seoul, Rep. of Korea

[21] Appl. No.: 521,017

[22] Filed: Aug. 30, 1995

[30] Foreign Application Priority Data

Aug. 31, 1994 [EP] European Pat. Off. ............. 94410072

[51] Int. Cl.[6] .................................................. H04M 1/22
[52] U.S. Cl. ...................... 379/387; 379/395; 379/396; 379/413; 315/169.3
[58] Field of Search .................................. 379/387, 395, 379/396, 373, 376, 162, 163, 164, 413; 330/297, 299; 315/169.3; 363/17, 19, 159

[56] References Cited

U.S. PATENT DOCUMENTS

| | | |
|---|---|---|
| 3,745,261 | 7/1973 | Friedman ................................ 379/395 |
| 3,959,602 | 5/1976 | Jayson ..................................... 179/81 |
| 4,564,729 | 1/1986 | Mills ........................................ 179/81 |
| 4,975,949 | 12/1990 | Wimsatt et al. ........................ 379/395 |
| 5,280,523 | 1/1994 | Lee ......................................... 379/376 |
| 5,422,947 | 6/1995 | Azem ..................................... 379/396 |
| 5,570,421 | 10/1996 | Morishima ............................. 379/396 |

OTHER PUBLICATIONS

European Search Report from European Patent Application No. 94410072.6, filed Aug. 31, 1994.
Patent Abstracts of Japan, vol. 12, No. 246 (e–632) Jul. 12, 1988 & JP–A–63 033 950 (NEC Corp.).

*Primary Examiner*—Krista Zele
*Assistant Examiner*—Jacques M. Saint-Surin
*Attorney, Agent, or Firm*—Wolf, Greenfield & Sacks, P.C.

[57] ABSTRACT

A transmit amplifier for a telephone set without its own power supply has an LED with an anode connected to a first positive terminal of the telephone line and a circuit that determines the ratio between the line current and the line voltage. The LED is supplied with a constant current and this current is derived when the voltage across the terminals of the line becomes lower than a predetermined value.

52 Claims, 6 Drawing Sheets

SPEECH AMPLIFIER ASSOCIATED WITH AN LED

BACKGROUND OF THE INVENTION

1. Field of the Invention

The invention relates to a speech transmit amplifier provided with a light emitting diode (LED). It more specifically applies to the control of the LED inside such an integrated amplifier in a telephone set.

2. Discussion of the Related Art

In a telephone set, an electroluminescent diode, or LED, is generally used for lighting the key-pad, or for indicating a hold or dialling condition. Commonly, the telephone set does not comprise its own power supply but is fed by a line current of a telephone signal on the telephone line, this line current being also used for feeding the LED. The telephone signal comprises a DC component, provided by the telephone exchange and sent on the telephone line to be used by the subscribers' telephone sets. The DC component of the telephone signal is variable as a function of the line length or other line parameters. The signal also comprises an AC component due to the modulation of the speech signal.

Conventionally, a predetermined fraction of the line current is used, inside the amplifier, to supply the LED. This fraction is usually about 25% of the line current. In such an instance, as the line current varies as a function of the line characteristics, the LED illumination is not constant. Indeed, this illumination is low for long lines and very low for parallel connections. On the contrary, if the line is short, the illumination is too strong and reduces the lifetime of the LED. Additionally, as the current oscillates about the DC component, the use of a fixed portion of the line current to control the LED causes the illumination to vary for a given line. Furthermore, the presence of the LED causes the transmitted signal to be distorted for high negative swings of the speech signal. In some cases, a very small but fixed amount of the line current is also used to light up the LED. But this current cannot be large, otherwise it will upset the voltage-current characteristics of the line. Therefore, in such cases, the LED illumination is poor.

SUMMARY OF THE INVENTION

It is an object of the invention to overcome the drawbacks of existing amplifiers with regard to LED control.

Another object of the invention is to provide a voice amplifier that feeds an LED with a constant current.

Another object of the invention is to avoid the distortion of the speech signal caused by the presence of an LED in the voice amplifier.

In one illustrative embodiment, the invention provides a telephone transmit amplifier for a telephone set that does not have its own power supply, comprising an LED having an anode connected to a first positive terminal of the telephone line and a circuit for determining a ratio between a line current and a line voltage, a reference current generator for supplying the LED with a constant current, and a deriving circuit for deriving the current flowing in the LED when the voltage across the terminals of the line becomes lower than a predetermined value.

According to an embodiment of the invention, the transmit amplifier further comprises a first operational amplifier measuring the current in the LED and whose feed-back loop limits this current to a value determined by the reference current generator.

According to an embodiment of the invention, a cathode of the LED is connected to the non-inverting input of the first amplifier.

According to an embodiment of the invention, the reference current generator comprises a bipolar PNP transistor having an emitter connected to the first terminal of the line and a collector connected to the inverting input of said first amplifier.

According to an embodiment of the invention, the deriving circuit comprises a transconductance amplifier whose feedback loop controls a switch that derives the current of the LED.

According to an embodiment of the invention, the switch comprises an NPN transistor whose collector is connected to the first terminal of the line and whose emitter is connected, through a low value resistor, to the cathode of the LED.

According to an embodiment of the invention, the circuit for determining the ratio between the line current and the line voltage comprises a second operational amplifier whose inverting input receives the speech signal to be transmitted, added to a DC component of the line voltage provided by a telephone exchange.

According to an embodiment of the invention, the feedback loop of the second amplifier comprises two Darlington-connected NPN transistors and two diodes, the collector of the second transistor being connected to the inverting input of the transconductance amplifier and the non-inverting input of the transconductance amplifier being connected to the anode of the second diode.

As the LED according to an embodiment of the invention is in series with the transmit amplifier, or speech circuit, the LED does not introduce any change in the current through the speech circuit.

As the LED according to an embodiment of the invention is supplied with a constant current, the telephone sets of various subscribers will have the same characteristics whatever be the line length. As the LED current is shunted when the voltage on the telephone line becomes too low, the presence of the LED in the speech transmit amplifier does not distort the AC signals.

Thus, a speech transmit amplifier is obtained whose operation is not modified by the presence of a LED, while optimizing the operation of this LED.

BRIEF DESCRIPTION OF THE DRAWINGS

Those objects, features and advantages, and others of the invention will be explained in detail in the following description of preferred embodiments made non-limitatively in connection with the attached drawings wherein.

DETAILED DESCRIPTION

A feature of an embodiment of the present invention is that the LED is serial connected with the speech circuit.

Figure 1:
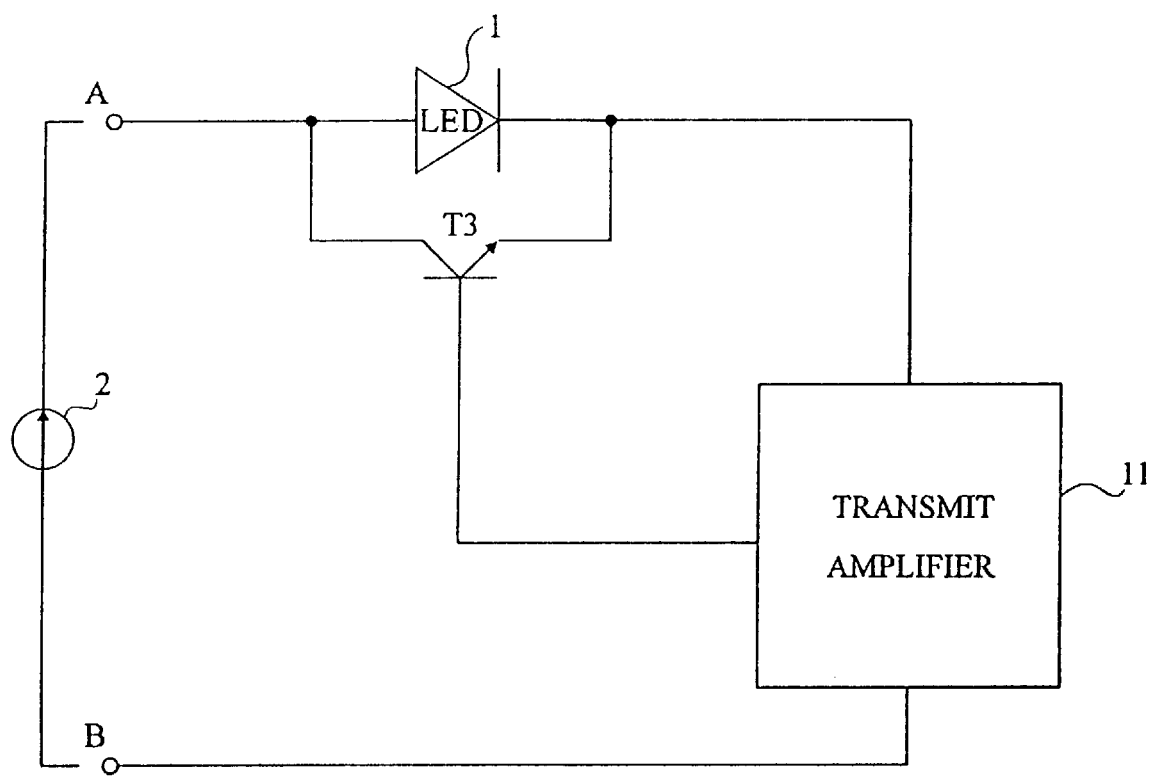
FIG. 1 is a block-diagram of a speech transmit amplifier associated with a LED according to the invention.

FIG. 1 schematically shows the connections between an LED 1 and a transmit amplifier 11 according to an embodiment of the present invention.

The telephone line is symbolized by a generator 2 between two terminals A and B of the circuit, terminal B corresponding to the circuit ground. In fact, a bridge and a dial pulser (not shown) may be connected between the telephone line and terminals A and B.

The anode of LED 1 is connected to terminal A and the cathode of LED 1 is connected to a first terminal of transmit amplifier 11, a second terminal of transmit amplifier 11 being connected to terminal B.

According to an embodiment of the invention, speech transmit amplifier 11 comprises means for deriving the current flowing in LED 1. Such means comprise, for example, a NPN transistor T3 whose collector is connected to terminal A and whose emitter is connected, preferably through a low value resistor (not shown in FIG. 1), to the cathode of LED 1. Transistor T3 is controlled by amplifier 11 to shunt LED 1 when the voltage on the telephone line becomes lower than a predetermined value.

Figure 2:
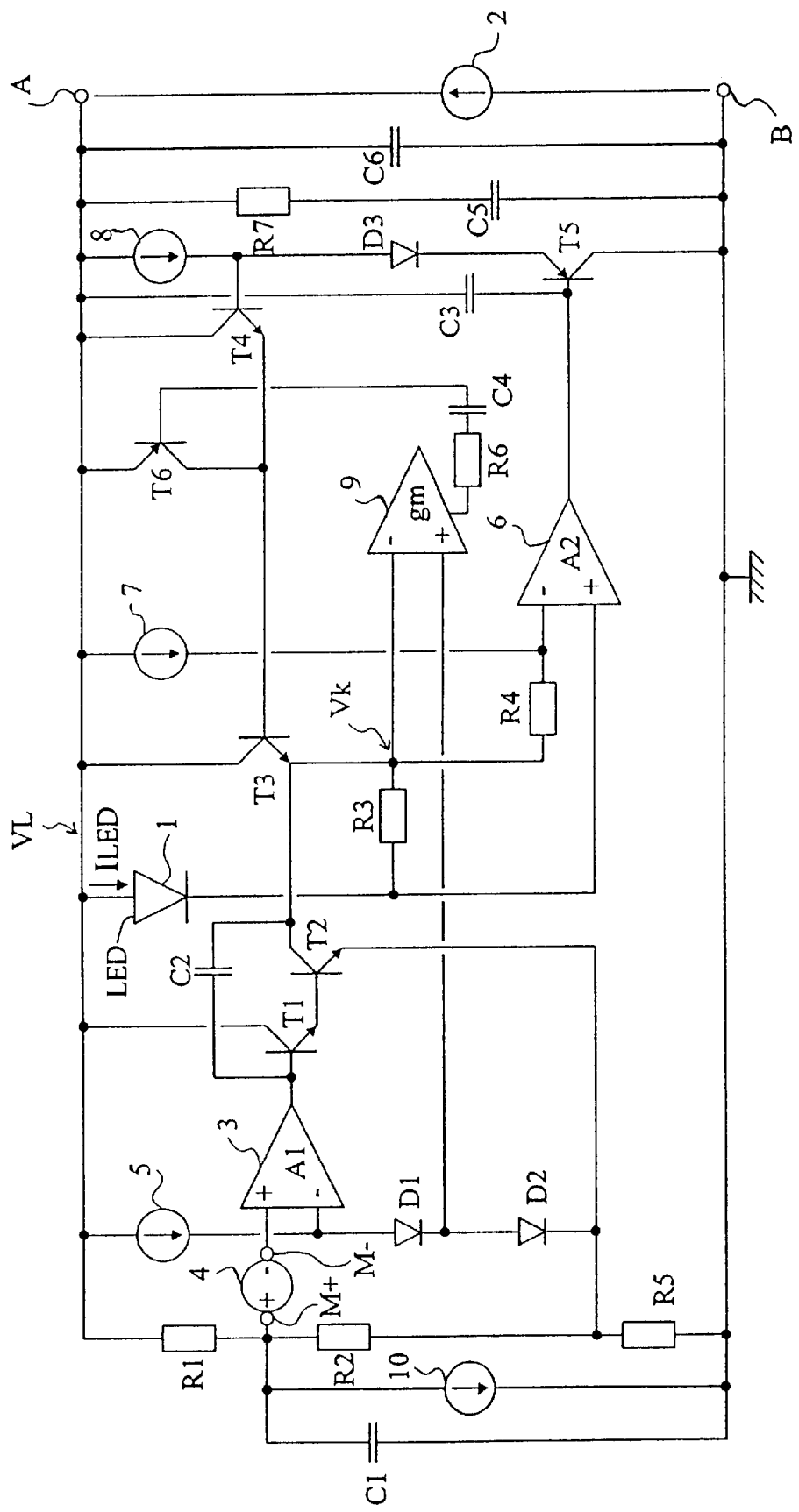
FIG. 2 schematically shows an embodiment of a speech transmit amplifier according to the invention.

The speech transmit amplifier shown in FIG. 2 mainly comprises three feed-back loops. The first loop controls the ratio between the line current IL and the line voltage VL. The second loop measures the current $I_{LED}$ flowing in the LED 1 and limits this current at a predetermined value. The third loop allows a suitable swing of the speech signal during the negative alternations, by deriving the current flowing in the LED 1.

The first loop may comprise a first operational amplifier A1 3. The non-inverting input of amplifier 3 is connected to a first positive terminal A of the circuit through a voltage generator 4 and a resistor R1. The voltage generator 4 corresponds to two input terminals M+ and M− in the circuit which represents the amplified signal from the telephone microphone (not shown). The negative input terminal M− of the microphone signal is connected to the non-inverting input of amplifier 3 and the positive input terminal M+ is connected to resistor R1. The inverting input of amplifier 3 is connected to terminal A through a first polarization current generator 5. This inverting input is also connected to the anode of a diode D1 serially connected with a diode D2. The cathode of diode D2 is connected to the ground terminal B of the circuit through a resistor R5 and to the positive input terminal M+ of the microphone signal 4 through a resistor R2.

The feed-back loop of the operational amplifier 3 comprises the two diodes D1 and D2 and two NPN transistors T1, T2. The output of amplifier 3 is connected to the base of transistor T1, the collector of which is connected to terminal A. The emitter of transistor T1 is connected to the base of transistor T2 whose collector is connected to terminal A through a resistor R3 and LED 1. The emitter of transistor T2 is connected to the cathode of diode D2. A capacitor C2 for frequency compensation of the first loop is connected between the collector of transistor T1 and the base of transistor T2.

The second loop comprises a second operational amplifier A2 6. The non-inverting input of amplifier 6 is connected to the cathode of LED 1. The inverting input of amplifier 6 is connected to terminal A through a reference current generator 7 and to the collector of transistor T2 of the first loop through a resistor R4.

The feed-back loop of amplifier 6 comprises the resistor R4, a diode D3 and three bipolar transistors T3, T4, T5. The output of amplifier 6 is connected to the base of a PNP transistor T5 whose collector is connected to terminal B. The emitter of transistor T5 is connected to the cathode of diode D3, the anode of which is connected to the base of the NPN transistor T4. The base of transistor T4 is also connected to terminal A through a second polarization current generator 8. The collector of transistor T4 is connected to terminal A and its emitter is connected to the base of the NPN transistor T3 whose collector is also connected to terminal A. The emitter of transistor T3 is connected to the collector of transistor T2 of the first loop and, through resistor R4, to the inverting input of amplifier 6. A capacitor C3 for frequency compensation of the second loop is connected between the base of transistor T5 and terminal A.

The third loop comprises a transconductance amplifier gm 9. The non-inverting input of amplifier 9 is connected to the anode of diode D2 of the first loop. The inverting input of amplifier 9 is connected to the collector of transistor T2 of the first loop.

The feed-back loop of the transconductance amplifier 9 comprises transistor T3 of the second loop and a PNP transistor T6. The output of amplifier 9 is connected to the base of transistor T6 whose emitter is connected to terminal A. The collector of transistor T6 is connected to the base of transistor T3, the emitter of transistor T3 being connected to the collector of transistor T2 and to the inverting input of amplifier 9. A resistor R6 serially connected with a capacitor C4 is connected between the output of amplifier 9 and its biasing input, so as to frequency compensate the third loop.

The circuit also comprises a positive temperature coefficient current source 10 between terminals B and M+.

For dynamic operation, the circuit also comprises capacitors. A capacitor C1 is connected in parallel with the current generator 10, its negative terminal being connected to terminal B. The capacitor C1 provides AC ground at terminal M+. A capacitor C5 serially connected with a resistor R7 is connected between terminals A and B. A capacitor C6 is connected between terminals A and B. Capacitors C5, C6 and resistor R7 model the AC termination of the exchange.

Figure 3:
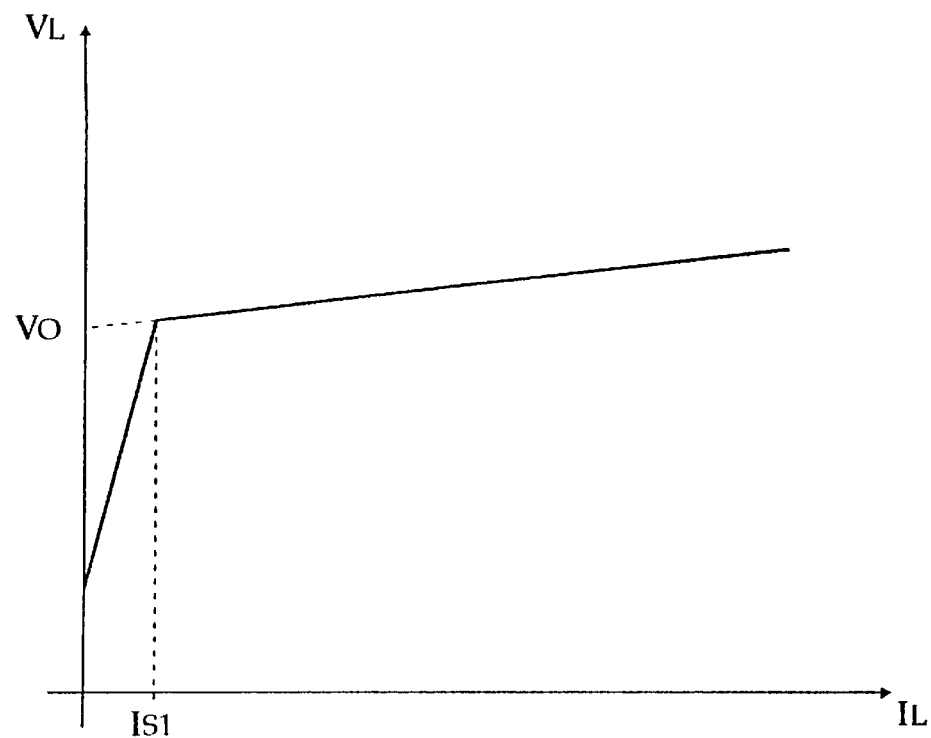
FIG. 3 illustrates the current-voltage curve of the transmit amplifier according to the invention.

FIG. 3 shows the voltage-current characteristic curve between terminals A and B of the circuit shown in FIGS. 1 and 2. This characteristic is determined by the first loop, that is by the current source 10, the operational amplifier 3, resistors R1, R2, R5, diodes D1, D2 and transistors T1, T2.

The line voltage VL is equal to the sum of the voltages across terminals R1, R2, R5. The voltage across R5 is equal to the product of the line current IL by resistance R5. In the absence of speech signal between terminals M+ and M−, the voltage across resistor R2 is equal to 2 Vbe, where Vbe represents the base-emitter voltage drop of a transistor (for example the voltage drop across each of the forward biased diodes D1 and D2). The voltage across resistor R1 is equal to the product of resistor R1 by the sum of the current Idc provided by the source 10 and the current circulating in resistor R2. This current in resistor R2 is equal to 2 Vbe/R2. Therefore, the relation between the line voltage VL and the line current IL can be written:

$$VL0=IL*R5+2(1+R1/R2)Vbe+Idc*R1$$

This characteristic curve presents, from a value V0 corresponding to 2(1+R1/R2)Vbe+Idc*R1, a slope determined by resistance R5. The current source 10 compensates for variations of the value of the base-emitter voltages Vbe as a function of the operating temperature. Therefore, V0 is a temperature compensated reference voltage. At low currents, i.e. IL<IS1, V0 is reduced by reducing Idc gradually. This is controlled by an external circuit (not shown).

In dynamic operation, e.g. in the presence of a speech signal at voltage generator 4, the voltage of line VL oscillates around a value VL0 determined by the above relation.

Figure 4:
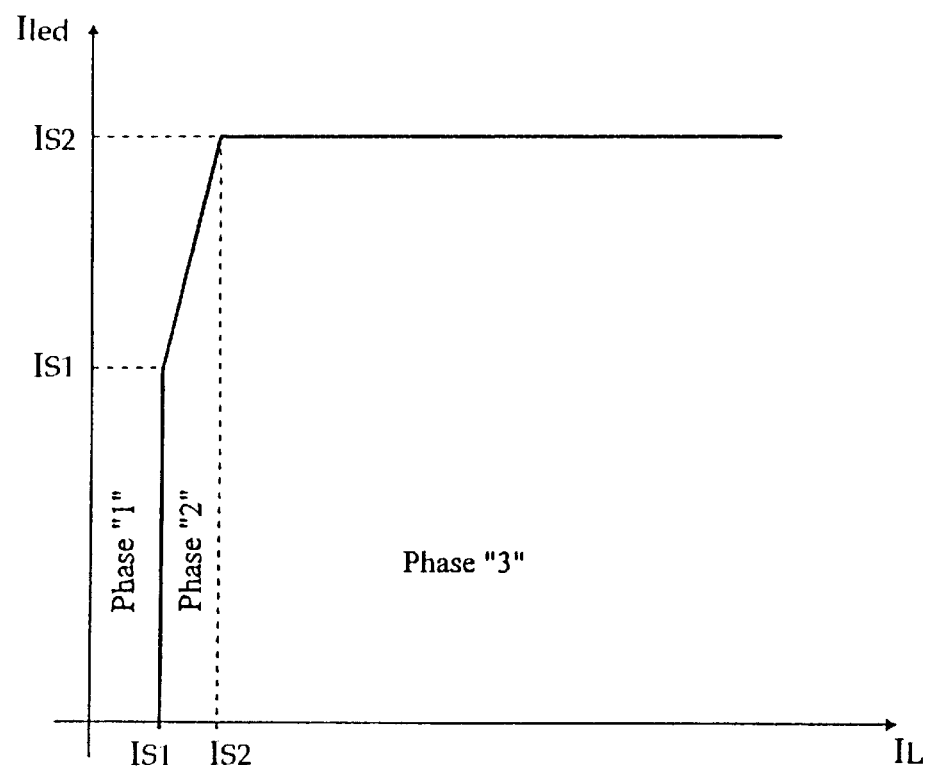
FIG. 4 illustrates the current in the LED as a function of the line current.

The current control of LED 1 is made through the second loop, that is the current source 7, operational amplifier 6, resistors R3, R4, diode D3 and transistors T3, T4, T5. Resistor R3 has a low value and is used for measuring the current $I_{LED}$ in LED 1 (flowing in the components 1, R3, T2 and R5). This current ILED is compared with a reference current generated by the generator 7 which flows in resistor R4. This second feed-back loop controls a limited portion of the line current IL to flow in the LED 1. So, as shown in FIG. 4, as long as the line current IL is lower than a threshold value Is2, the current in LED 1 varies like the current IL. As soon as the line current IL is sufficient, the current in LED 1 is limited to this threshold value Is2.

The threshold value Is2 is determined by the values of resistors R3 and R4 and of the current Iref provided by the reference current source 7:

$$Is2=Iref*R4/R3$$

The remaining portion of the line current, that is the difference between the line current IL and the threshold current Is2, flows in transistor T3. However, if IL becomes lower than Is2, the loop saturates. Therefore, transistor T3 cuts off and the input voltages of the operational amplifier 6 are no longer equal. In such an instance, the current in LED 1 is equal to IL.

The third loop controls the circuit of FIG. 1 to avoid a distortion of the transmitted signal for high amplitude swings of the speech signal. It derives current from LED 1 when the negative swings of the speech signals have a value such that the line voltage VL is lower than a threshold voltage Vs1. Accordingly, the transistor T2 does not saturate and does not cause a distortion of the transmitted signal.

The two inputs of the transconductance amplifier 9 are respectively connected to the collector and, through diode D2, to the emitter of transistor T2. A minimum voltage drop, equivalent to Vbe, is accordingly permanently maintained between the collector and the emitter of transistor T2 if the line voltage gets lower than the threshold value Vs1. Indeed, in this case, the feed-back loop of amplifier 9 causes transistor T6 to be on. Thus, transistor T3 shorts the serial connection of LED 1 and resistor R3. This third loop also cancels, through transistor T4, the operation of the second loop that controls the current of LED 1.

When the voltage VL is higher than the threshold voltage Vs1, the third loop saturates. Transistor T6 cuts off. Thus, this third loop is not active during the positive swings or the low value negative swings of the line voltage VL.

The effect of the third loop is particularly useful when the reference voltage V0 is low. Under such conditions, the risk of saturating transistor T2 during the negative swings increases if LED 1 is not shunted since V0 is also equal to the LED drop plus the collector-emitter drop of the transistor T2 plus the drop in the resistor R3 as forced by the first loop.

FIG. 4 shows the current Iled in LED 1 as a function of the line current IL in the absence of speech signals.

As long as the line current IL does not reach a value Is1 corresponding to the threshold voltage Vs1, the LED 1 is shunted (phase 1) and no current flows therein. This results from the action of the third loop, the second loop being saturated.

When the line current has a value between the threshold current Is1 and the threshold current Is2, Iled=IL (phase 2). This is a result of the action of only the first loop, the two other loops not being operative.

When the line current IL is higher than the threshold value Is2, Iled is limited to Is2 (phase 3). This is a result of the action of the second loop, the third loop being saturated.

FIGS. 5–8 are time diagrams illustrating the operation phases as a function of the speech signal swings. These figures represent the line voltage VL that corresponds to the anode potential of LED 1 and the potential Vk on the cathode of LED 1. In these figures, the line current IL is assumed to be higher than the threshold value Is2 in the absence of speech signal. In other words, the circuit is in the low slope portion of the voltage-current characteristic of FIG. 3.

Figure 5:
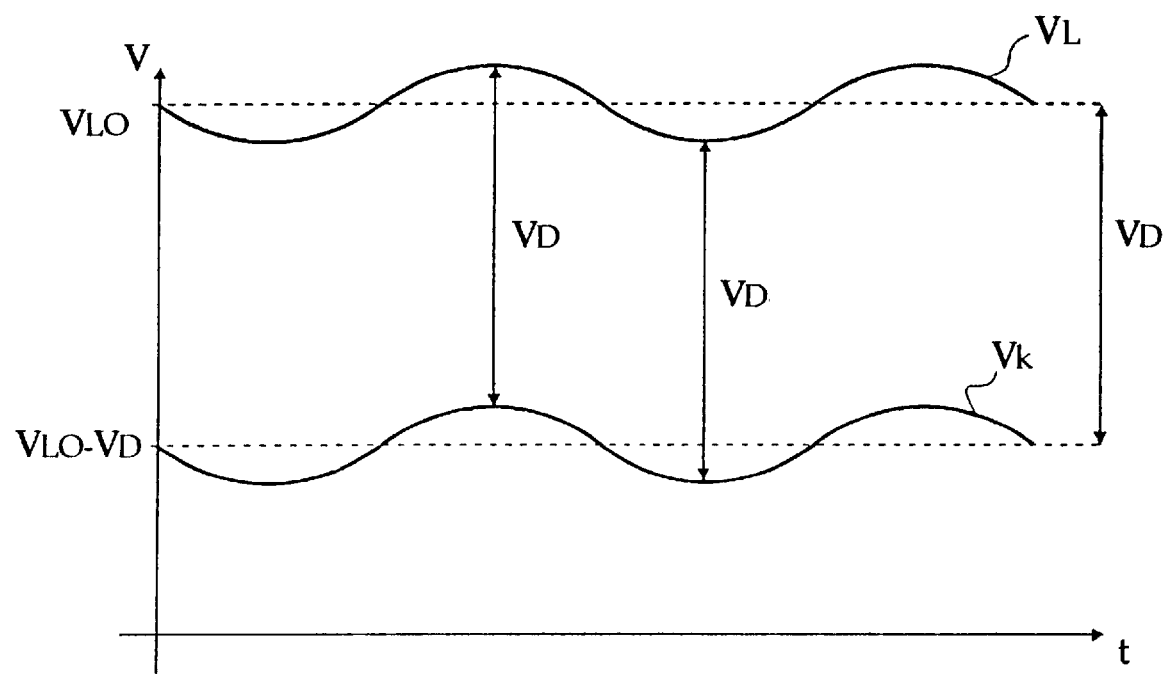
FIGS. 5, 6, 7, and 8 are chronograms illustrating the potentials across the LED for various amplitudes of the speech signal.

FIG. 5 shows small swings of the line voltage VL, that is a speech signal having a low amplitude around VL0. In this case, the LED 1 is permanently conductive and Vk=VL–VD, VD being the nominal voltage drop of the LED 1. FIG. 5 corresponds to the phase 3 of FIG. 4 for which the second loop is operative while the third loop is not operative.

Figure 6:
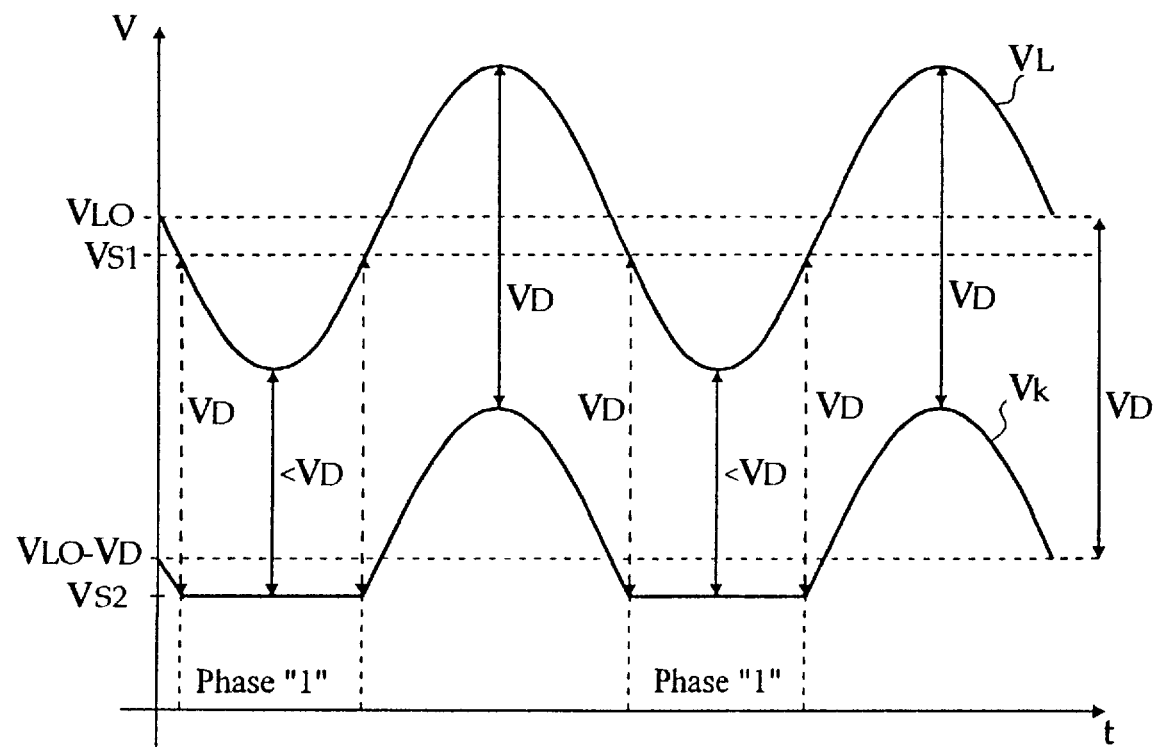

FIG. 6 illustrates higher swings of the speech signal around the value VL0 such that the negative swings of VL reach the threshold value Vs1. In this case, the third loop becomes operative and shunts the LED 1 (phase 1). The collector-emitter voltage of transistor T2 is maintained at Vbe by the third loop. Accordingly, the potential Vk of the cathode of LED 1 is also maintained at a voltage VS2 which is equal to Vbe plus the voltage drop in resistor R5 (VS2=Vbe+ILR5). The drop across the LED, VL–Vk, is now less than its normal value VD. This is due to partial shunting of the LED. This situation continues for still higher signal excursions until the LED is fully shunted, i.e. the LED drop is equal to Vbe(3)+VCEsat(6), where Vbe(3) is the base-emitter voltage of the transistor T3 and VCEsat(6) is the saturation collector-emitter voltage of the transistor T6.

Figure 7:
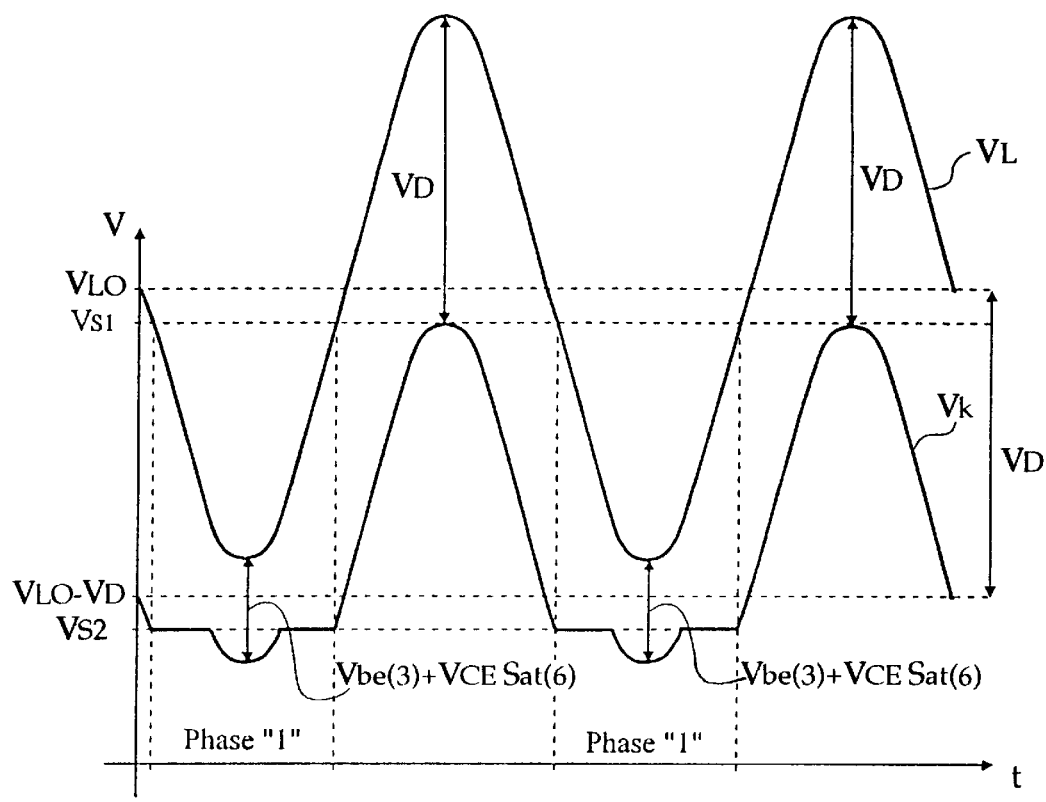

If the negative swings of the speech signal cause the line voltage VL to be at a still lower value, the voltage Vk of the cathode of LED 1 will not be maintained at VS2. This is because the third loop now saturates with the LED fully shunted and therefore, the collector-emitter voltage of transistor T2 drops below Vbe. The cathode voltage of LED 1 now decreases to VL–Vbe(3)–VCEsat(6). As long as the transistor T2 does not saturate, Vk follows the variation of the line voltage VL, exemplified by the clip in Vk at the bottom as shown in FIG. 7. Thus, the circuit remains in phase 1 when the first and third loops are active as shown in FIG. 7, providing a transmission without distortion of the speech signal.

Figure 8:
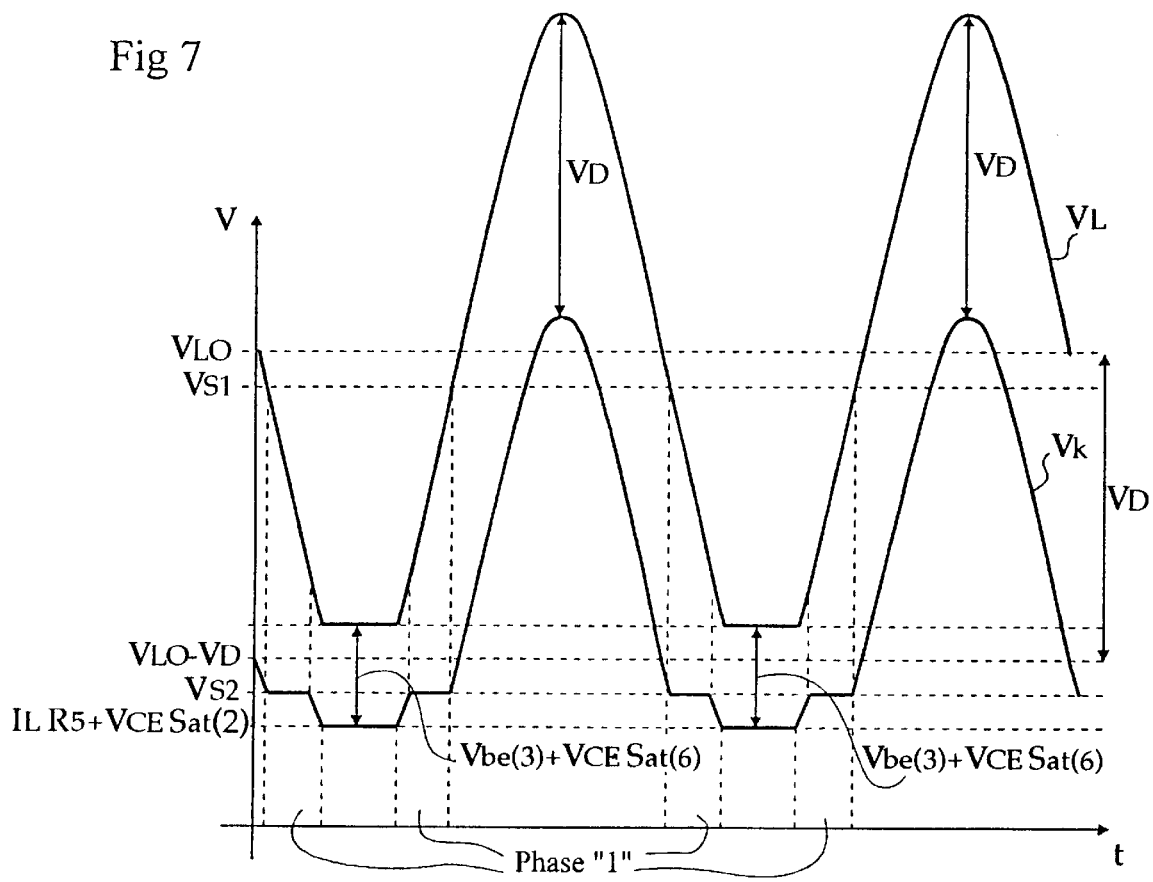

FIG. 8 shows speech signal oscillations that are such that the line voltage VL gets even lower further and causes the saturation of transistor T2. The speech signal is longer transmitted without distortion even in the absence of current flowing through LED 1 which is fully shunted at these very low voltages. The value ILR5+VCEsat(2) (where VCEsat(2) is the saturation collector-emitter voltage of the transistor T2) for voltage VL at its negative excursion thus constitutes the limit of the operation of the amplifier according to the invention to transmit an undistorted signal.

As an example, in one embodiment the LED 1 may have a nominal voltage VD equal to 2 V. We assume that there is on the line a DC line voltage VL0 varying between 3.5 and 5.5 V for IL=20 mA, and 100 mA respectively, and a speech signal whose swings are not higher than 2 V peak. Then, it is possible to select for the resistors and capacitors the following values:

R1:17 kΩ; C1:4.7 μF;
R2:39 kΩ; C2:5 pF;
R3:6 Ω; C3:20 pF;
R4:5 kΩ; C4:20 pF;
R5:20 Ω; C5:100 μF;
R6:9 kΩ; C6:10 nF;
R7:600 Ω.

For IL=20 mA, the collector-emitter voltage of transistor T2 is about 1.1 V. It is equal to 1.5 V when IL=100 mA. In the absence of the third loop, the voice signal would be distorted as soon as the speech signal swings attain a peak value of about 0.9 V (1.1 V–VCEsat(2) at IL=20 mA and 1.3 V at IL=100 mA). With the invention, this signal is not distorted. This is due to the fact that LED drop of 2 V is shunted with a lower voltage equal to 0.9 V (Vbe(3)+ VCEsat(6)). Therefore, there is at least 2.0–0.9=1.1 V more room for the transistor T2 to saturate.

Figure 9:
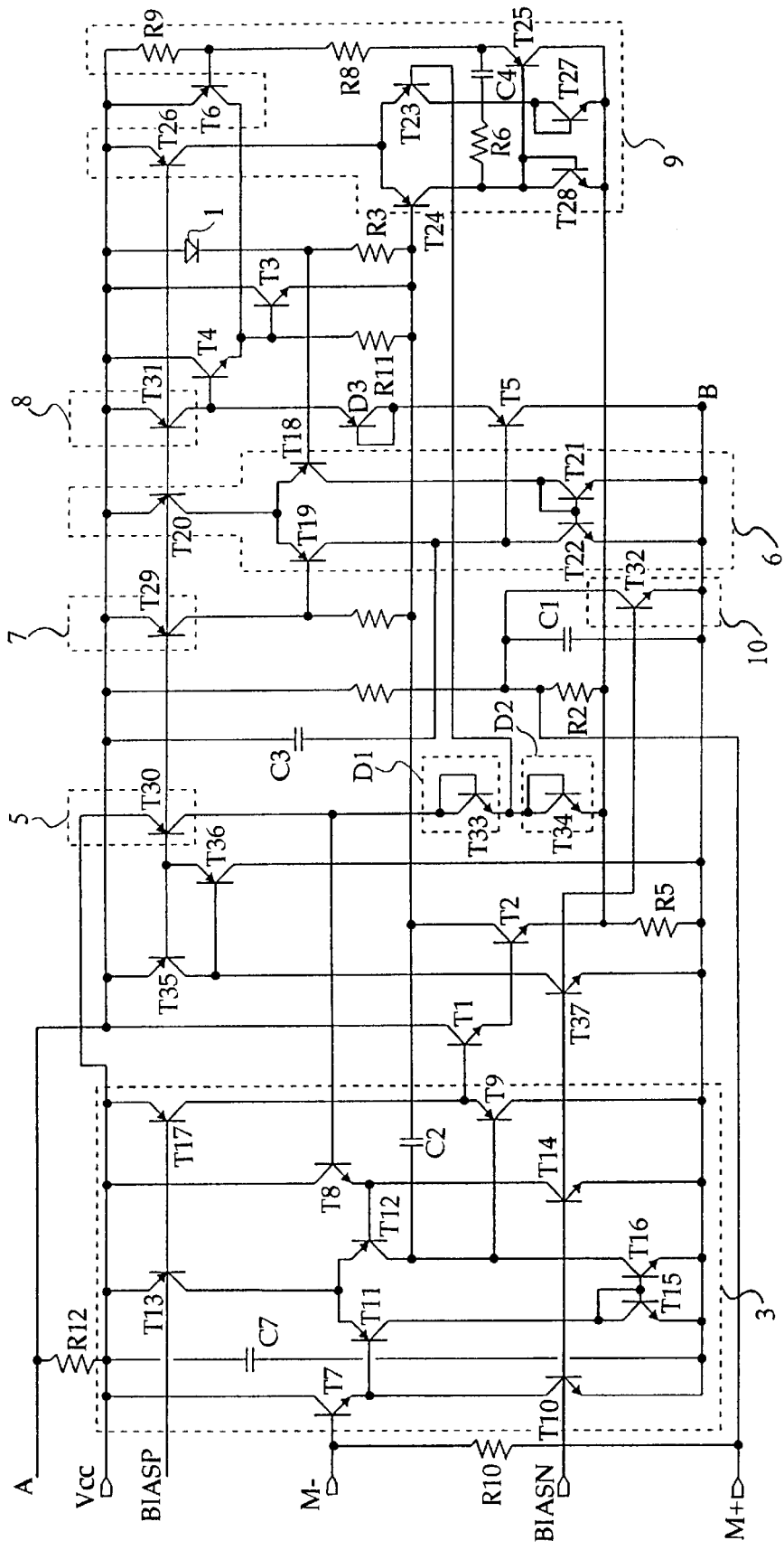
FIG. 9 illustrates a detailed implementation of the circuit of FIG. 2.

FIG. 9 shows an example of a detailed implementation of the circuit of FIG. 2. This circuit comprises the terminals A, B, M+ and M−. This circuit also comprises a terminal Vcc which gives a separate and stable supply for the amplifier A1 3. The Vcc supply is obtained from the line by means of a resistor R12 and a capacitor C7 serial connected between terminals A and B. The Vcc supply is also used to generate the bias currents of some transistors of the circuit and especially those constituting the amplifier A1 3. The details of the circuitry for obtaining those currents are not shown. Only two terminals, respectively Bias P and Bias N are represented in FIG. 9.

The operational amplifier A1 3 comprises eleven bipolar transistors T7–T17. The non-inverting input of amplifier 3 corresponds to the base of an NPN transistor T7. Its inverting input corresponds to the base of an NPN transistor T8. Its output is taken on the emitter of a PNP transistor T9. The collector of transistor T7 is connected to terminal Vcc while its emitter is connected to the collector of an NPN transistor T10 whose emitter is grounded (terminal B). The emitter of transistor T7 is also connected to the base of a PNP transistor T11. The emitter of transistor T11 is connected, with the emitter of a PNP transistor T12, to the collector of a PNP transistor T13 whose emitter is connected to terminal Vcc. The base of transistor T12 is connected to the emitter of transistor T8 whose collector is connected to terminal Vcc and whose base constitutes the inverting input of amplifier 3. The emitter of transistor T8 is also connected to the collector of an NPN transistor T14 whose emitter is grounded. The collectors of transistors T11, T12 are respectively connected to the collectors of NPN transistors T15, T16. The bases of transistors T15, T16 are connected to the collector of transistor T15 and their emitters are grounded. The collector of transistor T16 is connected to the base of transistor T9 whose collector is grounded. The emitter of transistor T9, which constitutes the output of amplifier 3, is connected to the collector of a PNP transistor T17 whose emitter is connected to terminal Vcc. The bases of transistors T13 and T17 are connected to terminal Bias P.

The operational amplifier A2 6 comprises five bipolar transistors T18–T22. The non-inverting input of amplifier 6 corresponds to the base of a PNP transistor T18. Its inverting input corresponds to the base of a PNP transistor T19 while its output corresponds to the collector of transistor T19. The emitter of transistor T18 is connected, with the emitter of transistor T19, to the collector of a PNP transistor T20 whose emitter is connected to terminal A. The collectors of transistors T18, T19 are respectively connected to the collectors of NPN transistors T21, T22. The bases of transistors T21, T22 are connected to the collector of transistor T21 and their emitters are grounded.

The transconductance amplifier gm 9 comprises six bipolar transistors T23–T28. The non-inverting input of amplifier 9 corresponds to the base of a PNP transistor T23. Its inverting input corresponds to the base of a PNP transistor T24 while its output is taken on the collector of a PNP transistor T25 through a resistor R8. The emitter of transistor T23 is connected, with the emitter of transistor T24, to the collector of a PNP transistor T26 whose emitter is connected to terminal A. The collectors of transistors T23, T24 are respectively connected to the collectors of NPN transistors T27, T28. The bases of transistors T27, T28 are connected to their own collector while their emitters are grounded. The emitter of transistor T25 is grounded and its base is connected to the collector of transistor T24. A resistor R9 is connected between a resistor R8 and terminal A.

The reference current generator 7 and the polarization generators 5 and 8 respectively correspond to PNP transistors T29, T30, T31. The emitters of transistors T29 and T31 are connected to terminal A while the emitter of transistor T30 is connected to terminal Vcc. The output of each generator 5, 7, 8 respectively corresponds to the collector of a respective transistor T30, T29, T31. The positive temperature coefficient current source 10 comprises an NPN transistor T32 whose emitter is grounded and whose collector is connected to the positive input M+ of the microphone amplified signal. The diodes D1 and D2 correspond to respective NPN transistors T33, T34 whose base and collector are interconnected. The circuit also comprises three transistors T35, T36, T37 for biasing the various transistors of the amplifiers 6 and 9. The emitter of a PNP transistor T35 is connected to terminal A while its collector is connected to the base of a PNP transistor T36 and to the collector of an NPN transistor T37. The emitter of transistor T37 is grounded. The emitter of transistor T36 is connected with the base of transistor T35 while the base of transistor T37 is connected to terminal Bias N. The bases of transistors T20, T26, T29, T30, T31 are connected together to the emitter of transistor T36 while the bases of transistors T10, T14 and T32 are connected to the base of transistor T37 (terminal Bias N). A resistor R10 is arranged between the inputs M+ and M− of the speech signal and a resistor R11 is arranged between base and emitter of transistor T3.

The other elements appearing on FIG. 9 are designated by the same reference as in FIG. 2.

Of course, many variants and modifications of the invention will appear to those skilled in the art. In particular, each of the disclosed components (operational amplifiers, transconductance amplifier, current sources, diodes, . . . ) can be replaced by one or a plurality of elements having the same or similar function. For example, the current sources made by means of transistors could be made by means of resistors.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A transmit amplifier for a telephone set, the telephone set having a positive terminal and a negative terminal coupled to and receiving power from a telephone line, the telephone line having a line current supplied at a line voltage, the telephone set further including a light emitting diode having a cathode and an anode that is connected to the positive terminal of the telephone line, the transmit amplifier comprising:

means, coupled to the telephone line, for determining a ratio between the line current and the line voltage;
a deriving circuit, coupled to the cathode of the light emitting diode, that derives current from flowing through the light emitting diode when the line voltage is lower than a predetermined value.

2. The transmit amplifier of claim 1, further comprising a supply circuit having an input, coupled to the output of the deriving circuit, that receives a control signal and an output, coupled to the cathode of the light emitting diode, that supplies the light emitting diode with a constant current;

and wherein the deriving circuit further includes means for providing the control signal for disconnecting the supply circuit from the light emitting diode when the line voltage is lower than a predetermined value.

3. The transmit amplifier of claim 2, wherein the supply circuit includes a feedback loop including:

a reference current generator having a first port coupled to the positive terminal of the telephone line, and having an output that provides a first reference signal;

a first transistor, coupled to the positive terminal of the telephone line and the cathode of the light emitting diode and responsive to a first control signal, that draws current from the line current to limit the current flowing through the light emitting diode to a value represented by the first reference signal; and a first operational amplifier, having a first input coupled to the output of the reference current generator and a second input that receives the first reference signal, and that outputs the first control signal that controls the first transistor.

4. The transmit amplifier of claim 3, wherein:

the first input of the operational amplifier is a non-inverting input;

the second input of the operational amplifier is an inverting input; and the cathode of the light emitting diode is connected to the non-inverting input.

5. The transmit amplifier of claim 3, wherein the reference current generator includes a bipolar PNP transistor having an emitter coupled to the first port and a collector coupled to the output of the reference current generator.

6. The transmit amplifier of claim 2, further comprising a load circuit, having an output coupled to the positive terminal and an input responsive to a control signal;

and wherein the means for determining the ratio between the line current and the line voltage includes an operational amplifier having an inverting input that receives a reference signal, a noninverting input that receives a speech signal, and an output that provides the control signal to the input of the load circuit, to control the load circuit to maintain the ratio between the line current and the line voltage to be substantially constant.

7. The transmit amplifier of claim 1, wherein the deriving circuit includes a second feedback loop including:

a switch, coupled to the cathode of the light emitting diode and responsive to a switch control signal, that limits current from flowing through the light emitting diode; and a transconductance amplifier, having a first input that receives a reference signal and a second input, coupled to the cathode of the light emitting diode, that outputs the switch control signal to control the switch when the line voltage is lower than the predetermined value of the line voltage.

8. The transmit amplifier of claim 7, wherein the switch comprises an NPN transistor having a collector coupled to the positive terminal of the telephone line and an emitter coupled through a resistor to the cathode of the light emitting diode.

9. The transmit amplifier of claim 7 wherein the means for determining the ratio between the line current and the line voltage further includes:

two NPN transistors connected in a Darlington arrangement, one of the two NPN transistors having a collector coupled to the second input of the transconductance amplifier; and a first and second diode connected in series, an anode of the second diode being connected to the first input of the transconductance amplifier.

10. A circuit powered by an input signal including a line voltage and a line current, the circuit comprising:

an LED having a cathode and an anode that receives the input signal;

a first control loop having an input that receives the input signal, the first control loop measuring a ratio between the line current and the line voltage and having an output that provides a first control signal; and a first load circuit, having an output coupled to cathode of the LED and responsive to the first control signal, that controls the ratio between the line current and the line voltage to remain substantially constant.

11. The circuit of claim 10, further comprising a voltage modulator that receives the input signal and modulates the input signal to create a speech signal.

12. The circuit of claim 11, wherein the voltage modulator is a telephone microphone.

13. The circuit of claim 10, further comprising:

a second control loop, having an input coupled to the cathode of the LED, the second control loop measuring a current flowing through the LED and outputting a second control signal; and a second load circuit, having an output coupled to the cathode of the LED, a first input that receives the input signal, and a second input that receives the second control signal, that limits the current flowing through the LED so that the current remains substantially constant, when the line current is greater than a predetermined value.

14. The circuit of claim 13 wherein:

the second load circuit includes a first transistor having a base responsive to the second control signal, a collector that receives the input signal, and an emitter coupled to the cathode of the LED, that draws current from the line current to limit the current flowing through the LED according to a reference signal; and the second control loop includes:

a reference current generator having an input that receives the input signal and an output that provides the reference signal; and a first operational amplifier, having a first input coupled to the cathode of the LED, a second input that receives the first reference signal, and that outputs the second control signal to control the first transistor.

15. The circuit of claim 10, further comprising:

a second control loop, having a first input coupled to the cathode of the LED and a second input receiving a signal indicative of the line current, the second control loop measuring the current flowing through the LED and providing a second control signal; and a second load circuit, having an output coupled to the cathode of the LED and responsive to the second control signal, that diverts the current flowing through the LED to the second load circuit when the line current is not greater than a predetermined value.

16. The circuit of claim 15, wherein the second load circuit includes a second transistor having a base responsive to the second control signal, a collector that receives the input signal, and an emitter coupled to the cathode of the LED, that limits the current flowing through the light emitting diode according to a second reference signal;

and wherein the second control loop includes a second operational amplifier having a first input coupled to the cathode of the LED, a second input that receives the second reference signal, and an output that controls the second transistor.

17. The circuit of claim 16, wherein the second operational amplifier is a transconductance amplifier.

18. The circuit of claim 10, wherein the first load circuit includes a transistor having an emitter coupled to the cathode of the LED, a base responsive to the first control signal, and a collector that receives the input signal, that controls the ratio between the line current and the line voltage to be substantially constant according to the first control signal;

and wherein the first control loop includes an operational amplifier having a first input receiving a reference voltage, a second input receiving a signal indicative of the ratio between the line current and the line voltage, and an output that provides the first control signal.

19. The circuit of claim 18 further including a current source, having an input that receives the input signal and an output coupled to the second input of the operational amplifier, that adjusts the signal indicative of the ratio between the line current and the line voltage, so that the ratio between the line current and the line voltage is substantially constant in the presence of the temperature variation.

20. The circuit of claim 19 wherein the current source includes a bipolar transistor having an emitter that receives the input signal, a base that receives a bias signal, and a collector coupled to the second input of the operational amplifier.

21. The circuit of claim 10 wherein the first control loop includes means, coupled to the input of the first control loop, for varying the ratio between the line current and the line voltage so that the ratio is substantially constant in the presence of a temperature variation.

22. A method for controlling current flowing through an LED in the presence of fluctuations of an input signal, the method comprising the steps of:

providing the input signal to an anode of the LED, the input signal having a line voltage and a line current;

controlling a first portion of the line current to flow from the anode of the LED to a cathode of the LED; and diverting a second portion of the line current from flowing through the LED to maintain a ratio between a line current and the line voltage to be substantially constant.

23. The method of claim 22, further comprising a step of modulating the input signal to provide a speech signal on the input signal.

24. The method of claim 22 wherein the step of controlling includes maintaining the portion of the line current to be substantially constant.

25. The method of claim 24, wherein the step of maintaining the portion of the line current includes the steps of:

maintaining the portion of the line current to be substantially constant when the line voltage is not less than a predetermined line voltage; and decreasing the portion of the line current when the line voltage is less than the predetermined line voltage.

26. The method of claim 22, wherein the step of diverting includes:

comparing a reference voltage to the line voltage;

increasing the line voltage when the reference voltage is greater than the line voltage; and decreasing the line voltage when the reference voltage is less than the line voltage.

27. The method of claim 26, wherein the step of comparing includes adjusting the reference voltage to compensate for a temperature variation of the reference voltage, so that the ratio between the line current and the line voltage is substantially constant in the presence of the temperature variation.

28. A method for controlling current flowing through an LED in the presence of fluctuations of an input signal, the method comprising the steps of:

providing the input signal to an anode of the LED, the input signal having a line voltage and a line current:

maintaining a ratio between the line current and the line voltage to be substantially constant; and controlling at least a portion of the line current to flow from the anode of the LED to a cathode of the LED:

wherein the step of maintaining includes adjusting the reference voltage to compensate for a temperature variation, so that the ratio between the line current and the line voltage is substantially constant in the presence of the temperature variation.

29. A circuit for controlling current flowing through an LED in the presence of fluctuations of an input signal including a line current and a line voltage, the circuit comprising:

an LED having a cathode and an anode that receives the input signal;

means, coupled to the cathode of the LED, for controlling a first portion of the line current to flow from the anode of the LED to the cathode of the LED; and means, coupled to the cathode of the LED, for diverting a second portion of the line current from flowing through the LED to maintain a ratio between a line current and the line voltage to be substantially constant.

30. The circuit of claim 29 further comprising a voltage modulator, coupled to the means for maintaining, that receives the input signal and modulates the input signal to produce a speech signal.

31. The circuit of claim 30, wherein the voltage modulator is a telephone microphone.

32. The circuit of claim 29 wherein the means for controlling includes means for maintaining the portion of the line current to be substantially constant.

33. The circuit of claim 32, wherein the means for maintaining the portion of the line current includes:

means for maintaining the portion of the line current to be substantially constant when the line voltage is not less than a predetermined line voltage; and means for decreasing the portion of the line current when the line voltage is less than the predetermined line voltage.

34. The circuit of claim 29, wherein the means for diverting includes:

means for comparing a reference voltage to the line voltage;

means, coupled to the means for comparing, for increasing the line voltage when the reference voltage is greater than the line voltage; and means, coupled to the means for comparing, for decreasing the line voltage when the reference voltage is less than the line voltage.

35. The circuit of claim 34, wherein the means for comparing includes means for adjusting the reference voltage to compensate for a temperature variation of the reference voltage, so that the ratio between the line current and the line voltage is substantially constant in the presence of the temperature variation.

36. A circuit for controlling current flowing through an LED in the presence of fluctuations of an input signal including a line current and a line voltage, the circuit comprising:

an LED having a cathode and an anode that receives the input signal;

means, coupled to the cathode of the LED, for receiving the input signal and for maintaining a ratio between the line current and the line voltage to be substantially constant; and means, coupled to the cathode of the LED, for controlling at least a portion of the line current to flow from the anode of the LED to the cathode of the LED;

wherein the means for maintaining includes means for adjusting the reference voltage to compensate for a temperature variation, so that the ratio between the line current and the line voltage is substantially constant in the presence of the temperature variation.

37. A telephone set comprising:

a microphone;

a keypad; and an amplifier circuit coupled to the microphone and the keypad, the amplifier circuit receiving an input signal having a line voltage and a line current, the amplifier circuit comprising:

an LED having a cathode and an anode that receives the input signal;

a first control loop having an input that receives the input signal, the first control loop measuring a ratio between the line current and the line voltage and having an output that provides a first control signal; and a first load circuit, having an output coupled to cathode of the LED and responsive to the first control signal, that controls the ratio between the line current and the line voltage to remain substantially constant.

38. The telephone set of claim 37, wherein the amplifier circuit further comprises:

a second control loop, having an input coupled to the cathode of the LED, the second control loop measuring a current flowing through the LED and outputting a second control signal; and a second load circuit, having an output coupled to the cathode of the LED, a first input that receives the input signal, and a second input that receives the second control signal, that limits the current flowing through the LED so that the current remains substantially constant, when the line current is greater than a predetermined value.

39. The telephone set of claim 38, wherein:

the second load circuit includes a first transistor having a base responsive to the second control signal, a collector that receives the input signal, and an emitter coupled to the cathode of the LED, that draws current from the line current to limit the current flowing through the LED according to a reference signal; and the second control loop includes:

a reference current generator having an input that receives the input signal and an output that provides the reference signal; and a first operational amplifier, having a first input coupled to the cathode of the LED, a second input that receives the first reference signal, and that outputs the second control signal to control the first transistor.

40. The telephone set of claim 37, wherein the amplifier circuit further comprises:

a second control loop, having a first input coupled to the cathode of the LED and a second input receiving a signal indicative of the line current, the second control loop measuring the current flowing through the LED and providing a second control signal; and a second load circuit, having an output coupled to the cathode of the LED and responsive to the second control signal, that diverts the current flowing through the LED to the second load circuit when the line current is not greater than a predetermined value.

41. The telephone set of claim 40, wherein the second load circuit includes a second transistor having a base responsive to the second control signal, a collector that receives the input signal, and an emitter coupled to the cathode of the LED, that limits the current flowing through the light emitting diode according to a second reference signal;

and wherein the second control loop includes a second operational amplifier having a first input coupled to the cathode of the LED, a second input that receives the second reference signal, and an output that controls the second transistor.

42. The telephone set of claim 41, wherein the second operational amplifier is a transconductance amplifier.

43. The telephone set of claim 37, wherein the first load circuit includes a transistor having an emitter coupled to the cathode of the LED, a base responsive to the first control signal, and a collector that receives the input signal, that controls the ratio between the line current and the line voltage to be substantially constant according to the first control signal;

and wherein the first control loop includes an operational amplifier having a first input receiving a reference voltage, a second input receiving a signal indicative of the ratio between the line current and the line voltage, and an output that provides the first control signal.

44. The telephone set of claim 43 wherein the amplifier circuit further includes a current source, having an input that receives the input signal and an output coupled to the second input of the operational amplifier, that adjusts the signal indicative of the ratio between the line current and the line voltage, so that the ratio between the line current and the line voltage is substantially constant in the presence of the temperature variation.

45. The circuit of claim 44 wherein the current source includes a bipolar transistor having an emitter that receives the input signal, a base that receives a bias signal, and a collector coupled to the second input of the operational amplifier.

46. The circuit of claim 37, wherein the first control loop includes means, coupled to the input of the first control loop, for varying the ratio between the line current and the line voltage so that the ratio is substantially constant in the presence of a temperature variation.

47. A telephone set comprising:

a microphone;

a keypad; and an amplifier circuit coupled to the microphone and the keypad, the amplifier circuit receiving an input signal having a line voltage and a line current, the amplifier circuit comprising:

an LED having a cathode and an anode that receives the input signal;

means, coupled to the cathode of the LED, for controlling a first portion of the line current to flow from the anode of the LED to the cathode of the LED; and means, coupled to the cathode of the LED, for diverting a second portion of the line current from flowing through the LED to maintain a ratio between a line current and the line voltage to be substantially constant.

48. The telephone set of claim 47, wherein the means for controlling includes means for maintaining the portion of the line current to be substantially constant.

49. The telephone set of claim 48, wherein the means for maintaining the portion of the line current includes:

means for maintaining the portion of the line current to be substantially constant when the line voltage is not less than a predetermined line voltage; and means for decreasing the portion of the line current when the line voltage is less than the predetermined line voltage.

50. The telephone set of claim 47, wherein the means for diverting includes:

means for comparing a reference voltage to the line voltage;

means, coupled to the means for comparing, for increasing the line voltage when the reference voltage is greater than the controlled voltage; and means, coupled to the means for comparing, for decreasing the line voltage when the reference voltage is less than the controlled voltage.

51. The telephone set of claim 50, wherein the means for comparing includes means for adjusting the reference voltage to compensate for a temperature variation of the reference voltage, so that the ratio between the line current and the line voltage is substantially constant in the presence of the temperature variation.

52. A telephone set comprising:

a microphone:

a keypad; and an amplifier circuit coupled to the microphone and the keypad, the amplifier circuit receiving an input signal having a line voltage and a line current, the amplifier circuit comprising:

an LED having a cathode and an anode that receives the input signal;

means, coupled to the cathode of the LED, for receiving the input signal and for maintaining a ratio between the line current and the line voltage to be substantially constant; and means, coupled to the cathode of the LED, for controlling at least a portion of the line current to flow from the anode of the LED to the cathode of the LED;

wherein the means for maintaining the ratio includes means for adjusting the reference voltage to compensate for a temperature variation, so that the ratio between the line current and the line voltage is substantially constant in the presence of the temperature variation.

\* \* \* \* \*